(12) United States Patent
Folkmanis et al.

(10) Patent No.: US 10,305,994 B2
(45) Date of Patent: *May 28, 2019

(54) SYNCHRONIZING ACTION EXECUTION ACROSS NETWORKED NODES USING RELATIVE TIME

(71) Applicant: Google LLC, Mountain View, CA (US)

(72) Inventors: Girts Folkmanis, San Francisco, CA (US); Paul Heninwolf, San Carlos, CA (US)

(73) Assignee: Google LLC, Mountain View, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/151,511

(22) Filed: May 11, 2016

(65) Prior Publication Data

US 2016/0254922 A1     Sep. 1, 2016

Related U.S. Application Data

(63) Continuation of application No. 13/489,891, filed on Jun. 6, 2012, now Pat. No. 9,363,304.

(51) Int. Cl.
*H04L 29/08* (2006.01)
*H05B 37/02* (2006.01)
(Continued)

(52) U.S. Cl.
CPC .......... *H04L 67/125* (2013.01); *G05B 19/042* (2013.01); *G05B 19/0426* (2013.01);
(Continued)

(58) Field of Classification Search
CPC ............. H04L 12/2803; H04L 12/2829; H04L 2012/285; H04L 43/0852; H04L 43/106;
(Continued)

(56) References Cited

U.S. PATENT DOCUMENTS

| | | |
|---|---|---|
| 4,194,818 A | 3/1980 | Matteson et al. |
| 5,174,472 A | 12/1992 | Raque et al. |

(Continued)

FOREIGN PATENT DOCUMENTS

WO     0223744 A2     3/2002

OTHER PUBLICATIONS

Extended European Search Report for European Application 13170931.3 dated Mar. 14, 2016.

(Continued)

*Primary Examiner* — Crystal J Barnes-Bullock
(74) *Attorney, Agent, or Firm* — Colby Nipper

(57) ABSTRACT

A way of synchronizing action execution across networked nodes using relative time. A command and a first time value can be received at a first networked device, where the first time value can correspond to a relative time at which an action is to occur. The command can be forwarded to another, second networked device along with a second relative time value that has been adjusted to take into account the elapsed time between the receipt of the command at the first device and the sending of the command to the second device. The action, which can include one or more events, can be caused to take place upon the execution of the command at about the first time value after the command was received at the first device and at about the second time value after the command was received at the second device.

20 Claims, 4 Drawing Sheets

(51) Int. Cl.
   *H04L 12/28*     (2006.01)
   *H04L 12/26*     (2006.01)
   *G05B 19/042*    (2006.01)
   *G06F 9/445*     (2018.01)
   *G06F 17/40*     (2006.01)
   *G06F 1/14*      (2006.01)
   *G06F 1/12*      (2006.01)

(52) U.S. Cl.
   CPC .............. *G06F 1/12* (2013.01); *G06F 1/14* (2013.01); *G06F 9/445* (2013.01); *G06F 17/40* (2013.01); *H04L 12/282* (2013.01); *H04L 12/2803* (2013.01); *H04L 12/2829* (2013.01); *H04L 43/0817* (2013.01); *H04L 43/0852* (2013.01); *H04L 43/106* (2013.01); *H04L 43/16* (2013.01); *H04L 67/025* (2013.01); *H05B 37/02* (2013.01); *H05B 37/029* (2013.01); *H05B 37/0209* (2013.01); *H05B 37/0272* (2013.01); *H05B 37/0281* (2013.01); *G05B 2219/2642* (2013.01); *H04L 2012/285* (2013.01); *H04L 2012/2841* (2013.01)

(58) Field of Classification Search
   CPC ..... H04L 43/16; H04L 67/025; H04L 12/282; H04L 2012/2841; H04L 43/0817; H04L 67/125; H05B 37/02; H05B 37/029; H05B 37/0272; H05B 37/0281; G05B 19/0426; G05B 2219/2642; G06F 9/445; G06F 17/40
   See application file for complete search history.

(56) References Cited

U.S. PATENT DOCUMENTS

| | | | |
|---|---|---|---|
| 5,769,527 A | | 6/1998 | Taylor et al. |
| 6,379,025 B1 | | 4/2002 | Mateescu et al. |
| 6,522,346 B1 | | 2/2003 | Meyer et al. |
| 6,608,453 B2 | | 8/2003 | Morgan et al. |
| 6,611,495 B1 | | 8/2003 | Meyer et al. |
| 6,714,977 B1 | | 3/2004 | Fowler et al. |
| 7,039,086 B2 | * | 5/2006 | Fallon ................. G03F 7/70025 372/55 |
| 7,221,984 B2 | | 5/2007 | Bennett et al. |
| 7,331,527 B2 | | 2/2008 | Mo et al. |
| 7,504,780 B2 | | 3/2009 | Isobe et al. |
| 7,514,884 B2 | | 4/2009 | Potucek et al. |
| 7,602,283 B2 | | 10/2009 | John et al. |
| 7,688,344 B2 | | 3/2010 | Kimber et al. |
| 7,809,448 B2 | | 10/2010 | Lys et al. |
| 7,812,551 B2 | | 10/2010 | Hite et al. |
| 7,903,597 B2 | * | 3/2011 | Biederman ........... H04B 1/1615 370/311 |
| 8,214,491 B2 | | 7/2012 | Juric et al. |
| 8,223,804 B2 | * | 7/2012 | Koga .................... H04J 3/0682 370/414 |
| 8,274,374 B2 | | 9/2012 | Kim et al. |
| 8,316,154 B2 | * | 11/2012 | Yoneda ................. H04L 12/282 709/203 |
| 8,589,122 B2 | | 11/2013 | Nagatsuka et al. |
| 9,860,965 B2 | * | 1/2018 | Recker ............... H05B 37/0272 |
| 9,955,551 B2 | * | 4/2018 | Spero ...................... B60Q 1/04 |
| 10,075,334 B1 | * | 9/2018 | Kozura ............... H04L 41/0806 |
| 10,219,975 B2 | * | 3/2019 | Potucek ............... A61H 33/005 |
| 2004/0258097 A1 | | 12/2004 | Arnold et al. |
| 2008/0153477 A1 | | 6/2008 | Cloutier et al. |
| 2010/0293558 A1 | | 11/2010 | Jang et al. |
| 2011/0089864 A1 | | 4/2011 | Wasniewski et al. |
| 2011/0089866 A1 | | 4/2011 | Trotter et al. |
| 2011/0090681 A1 | | 4/2011 | Hobson et al. |
| 2011/0276648 A1 | | 11/2011 | Soldan et al. |
| 2012/0042047 A1 | | 2/2012 | Chen et al. |
| 2012/0172118 A1 | * | 7/2012 | Shimamura .............. H04R 3/04 463/31 |
| 2013/0147366 A1 | | 6/2013 | Huizenga et al. |
| 2013/0231760 A1 | | 9/2013 | Rosen et al. |
| 2016/0132031 A1 | * | 5/2016 | Kozura ............... H04L 12/2816 700/275 |

OTHER PUBLICATIONS

Office Action dated May 3, 2017 as received in EP Application No. 13170931.3.

* cited by examiner

SYNCHRONIZING ACTION EXECUTION ACROSS NETWORKED NODES USING RELATIVE TIME

CROSS-REFERENCE TO RELATED APPLICATIONS

This application claims the benefit of U.S. patent application Ser. No. 13/489,891, filed on Jun. 6, 2012, which is herein incorporated herein by reference in its entirety.

BACKGROUND

The present disclosure relates to operation of interconnected devices, and more specifically to synchronization of action execution across networked nodes using relative time.

It can be desirable to cause an action to occur that includes several events. Some of the events can be controlled by nodes in a network. In some cases, the events should occur substantially simultaneously to correctly execute the action. For example, in a home automation system, a light switch can be configured to turn on and off several lights at once. Each light can be controlled by an autonomous network device that communicates with other such devices over a wireless network. It may be desirable to ensure that all of the lights turn on and off at about the same time when the user actuates the light switch. Operation of other devices may similarly be desirably operated (e.g., turned on, or off, increase audio volume, or mute, or other change in state) in synchronization.

Some network topologies require an on or off command to propagate to a given node over several "hops" from one node to another. The simultaneity of the on or off action needs to take into account the traversal time of the command across the nodes, as well as any transmission failures and transmission retries.

In some cases, commands cannot be synchronized with respect to an absolute point in time because the nodes do not have available or cannot agree on a network-wide absolute time metric, e.g., an universal timestamp, due to protocol or device constraints.

SUMMARY

A first device receives a command and a first time value. The first time value can correspond to the relative time that an action is to occur. For example, if the first time value is 500 ms, then the action is to occur about 500 ms after the command and/or the first time value is received at the first device. An action can include at least one event, such as turning on or off one or more lights.

A first elapsed time value can be generated based upon the time between the receipt of the command or the first time value at the first device and about the time at which the first device sends the command or a second time value to a second device. We intend the term "about" to be interpreted as "to a large extent", "as near as practicable", "within technical limitations", and the like. The second time value can be generated by subtracting the first elapsed time value from the first time value. The second time value can correspond to the relative time at which the action is to occur, taking into account delay between the receipt of the command or first time value by the first device and its transmission to the second device. The command and/or the second time value can be sent to the second device. The second device can cause an event to occur at about the second time value after which the command or second time value is received at the first device, e.g., a light in communication with the second device can be turned on. If a first light in communication with the first device is also turned on at about the first time value after the command or the first time value were received at the first device, then both lights would turn on at about the same time. Turning on both lights can be considered to be an action.

DETAILED DESCRIPTION

Figure 1:
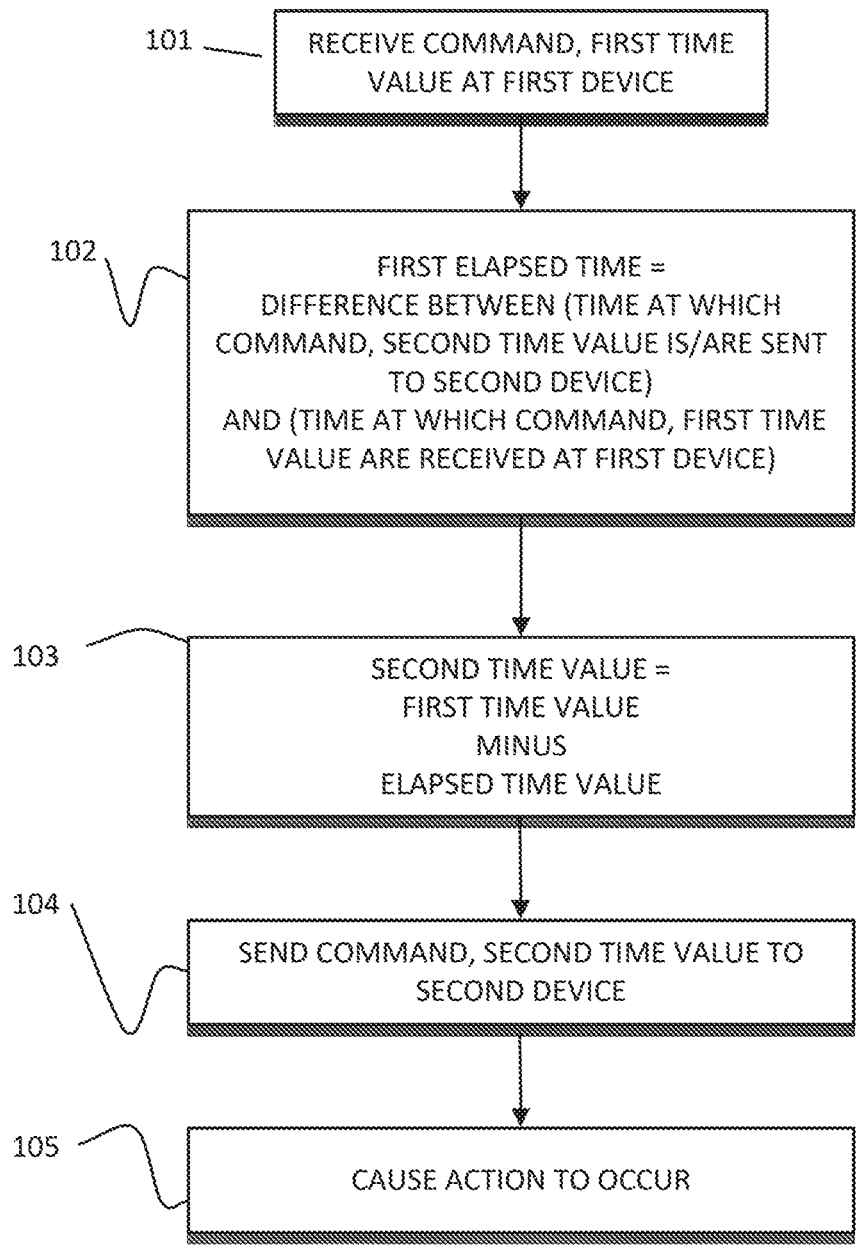
FIG. 1 shows a flowchart of a process in accordance with an implementation of the disclosed subject matter.

In accordance with various implementations, an action (e.g., the occurrence of at least one event) is timed to occur across networked nodes using relative time.

A command generator can generate or relay a command with a first time value to a first device. The command can relate to an action that can include one or more events, such as turning on or off one or more lights, activating or deactivating one or more electronic devices, sending one or more messages, etc. The first time value can specify a relative time at which the action is to occur. For example, the first time value can specify time that is meant to elapse between the time at which the command and/or first time value is received at the first device and the time at which the action is to occur. The first time value can represent the relative time at which the action is to occur from the receipt of either the command or the receipt of the first time value at the first device. The command and the first time value may be received at exactly or about the same time. Thus, receiving a command or a time value can include receiving the command or the time value first, or receiving them together, e.g., as part of separate messages or as part of the same message.

The first time value can be part of the command or be separate from the command. Further, the command and the time value can originate or be relayed to the first device from separate generators or devices.

The first device can generate an elapsed time value based upon the time between which the command or first time value is received at the first device and about the time at which the first device sends the command to a second device. The first device can generate a second time value by subtracting the elapsed time value from the first time value. The second time value can represent the relative time at which the action is to occur, taking into account the time that the first device took to forward the command or the second time value. The command and the second time value can be sent from the first device to the second device. An action can be caused to occur at about the first time value after which the command or first time value is received at the first device. For example, a first light can be caused to be turned on at the first time value after the command or first time value is received at the first device. Likewise, a second light can be caused to turn on at or about the second time value after which the second device receives the command or the second time value. Thus, the first and second lights would turn on at or about the same time. Alternatively, no event may be caused by or take place at the first device. Rather, only a second light may be caused to turn on. In this way, the first device can function as a relay for the command and the time value.

In implementations, a first device can store a first timestamp that is based upon value of a first device timer at about the time the command or first time value is received at the first device. An elapsed time value can be generated based upon the difference between the value of the first device timer at about the time the command or a second time value is sent from the first device to the second device, and the value of the first timestamp. A first device timer can be started at about the time at which the command or first time value is received at the first device. An elapsed time value can be generated based upon the value of the first device timer at about the time the command or the second time value is sent from the first device to the second device.

The second device can generate a second elapsed time value based upon the time between the receipt of the command or the second time value at the second device and about the time at which the second device sends the command or a third time value to a third device or to a plurality of other devices. The third time value can be generated by subtracting the elapsed time value from the second time value. The command and the third time value can be sent from the second device to the third device.

An event can be caused to occur in connection with the second device, e.g., a light can be turned on or off, at the second time value after which the command or the second time value is received at the second device.

In implementations, an acknowledgement timer can be started at about the time the command and/or the second time value is/are sent to the second device. If the acknowledgement timer has attained a threshold value before receiving an acknowledgement from the second device, then the first device can generate an adjusted second timer value by adding to the second timer value about the amount of time that has elapsed between the time at which the command and the second timer value were sent to the second device and the time at which the command and the adjusted second timer value are sent to the second device. The command and the adjusted second timer value can be sent to the second device. This can help to assure the timely occurrence of the action if, for example, the command and/or the second time value is or are not received at the second device, e.g., due to a temporary network failure, relay failure, interference, etc. This process can be repeated several times (e.g., a predetermined number of times, a number of times until the first time expires, until an action is due to occur, etc.) when an acknowledgment is not received (or not timely received) at the sending device, such as the first device in this example. In addition to the first device recognizing a failed transmission based on a time-out threshold, there could also be alternate mechanisms such as an explicit "NACK" (not-ack), from the second device indicating, for example, that it received a garbled command and needs a retransmission. Any other suitable mechanism can be used that helps the first device to determine that a retransmission to the second device is needed.

In implementations, the first elapsed time value can be further based on the transit time between the first device and the second device. The transit time can be estimated by the first device. The estimate of the transit time can be based on observations, e.g., by timing a round trip ping from the first device to the second device, by averaging many such pings.

FIG. 1 shows flow chart in accordance with an implementation of the disclosed subject matter. A command and/or a first time value can be received at a first device, 101, which can be a node in a network. The command and the first time value can be received together or separately, from one or from more than one source. The time value can relate to the timing of the occurrence of an action. The first device can calculate an elapsed time value based on the difference between the time at which the first device receives the command, the first time value, or some other first triggering event and the time that the command, a second time value or a second triggering event occurs, 102. The first device can calculate the second time value based upon the first time value and the elapsed time value, 103. The second time value and the command can be sent to a second device 104. The command can be sent from the first device or from another source. The second time value can be sent from the first device or from another source. An event can be caused to occur at a second time value after the command and/or the second time value is received at the second device, 105. An event can be caused to occur at the first time value after the time at which the command or the first time value was received at the first device. Separately or together, the events can be an action. The events can also occur at the first and second time values after the time of a first and second triggering event. The command received at the first device can be different than the command received at the second device.

Figure 2:
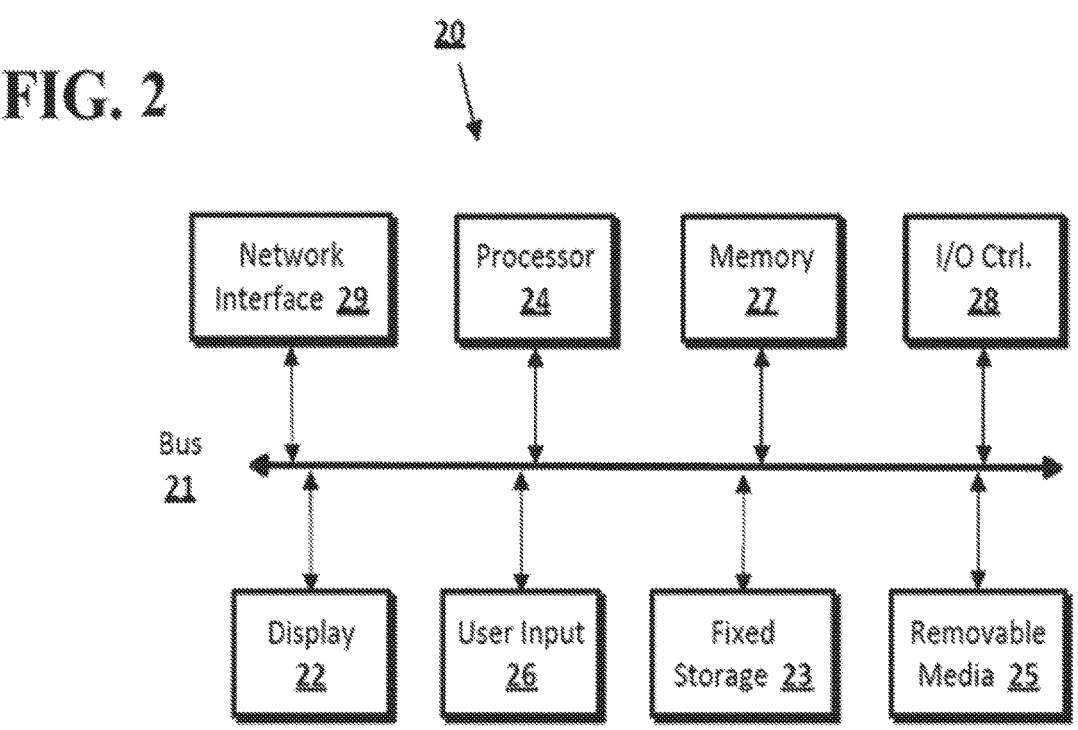
FIG. 2 shows a computer according to an implementation of the disclosed subject matter.

Implementations of the presently disclosed subject matter may be implemented in and used with a variety of component and network architectures. FIG. 2 is an example computer 20 suitable for implementing the presently disclosed subject matter. The computer 20 includes one or more of: a bus 21 which interconnects major components of the computer 20, a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) that controls basic hardware operation such as the interaction with peripheral components. Optionally, applications resident with the computer 20 are generally stored on and accessed via a computer readable medium, such as a hard disk drive (e.g., fixed storage 23), solid-state storage (e.g., flash drive), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet Service Provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
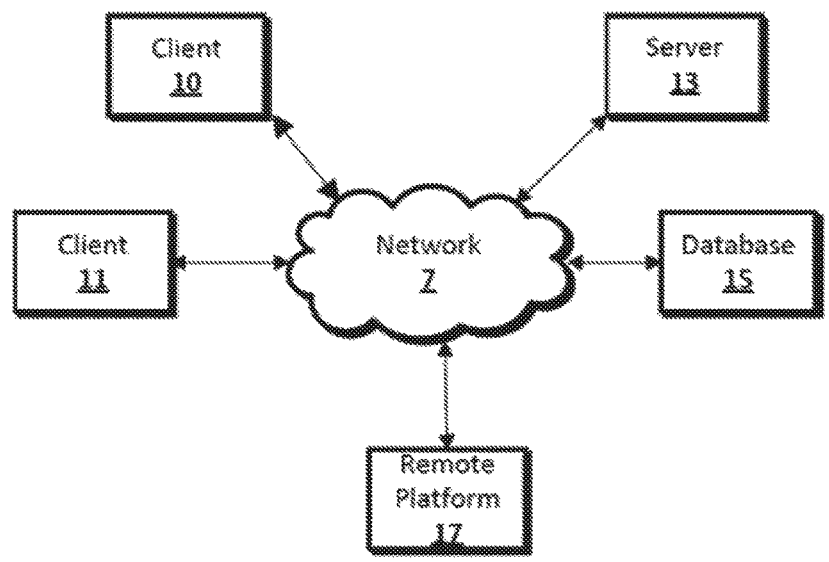
FIG. 3 shows a network configuration according to an implementation of the disclosed subject matter.

FIG. 3 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 4:
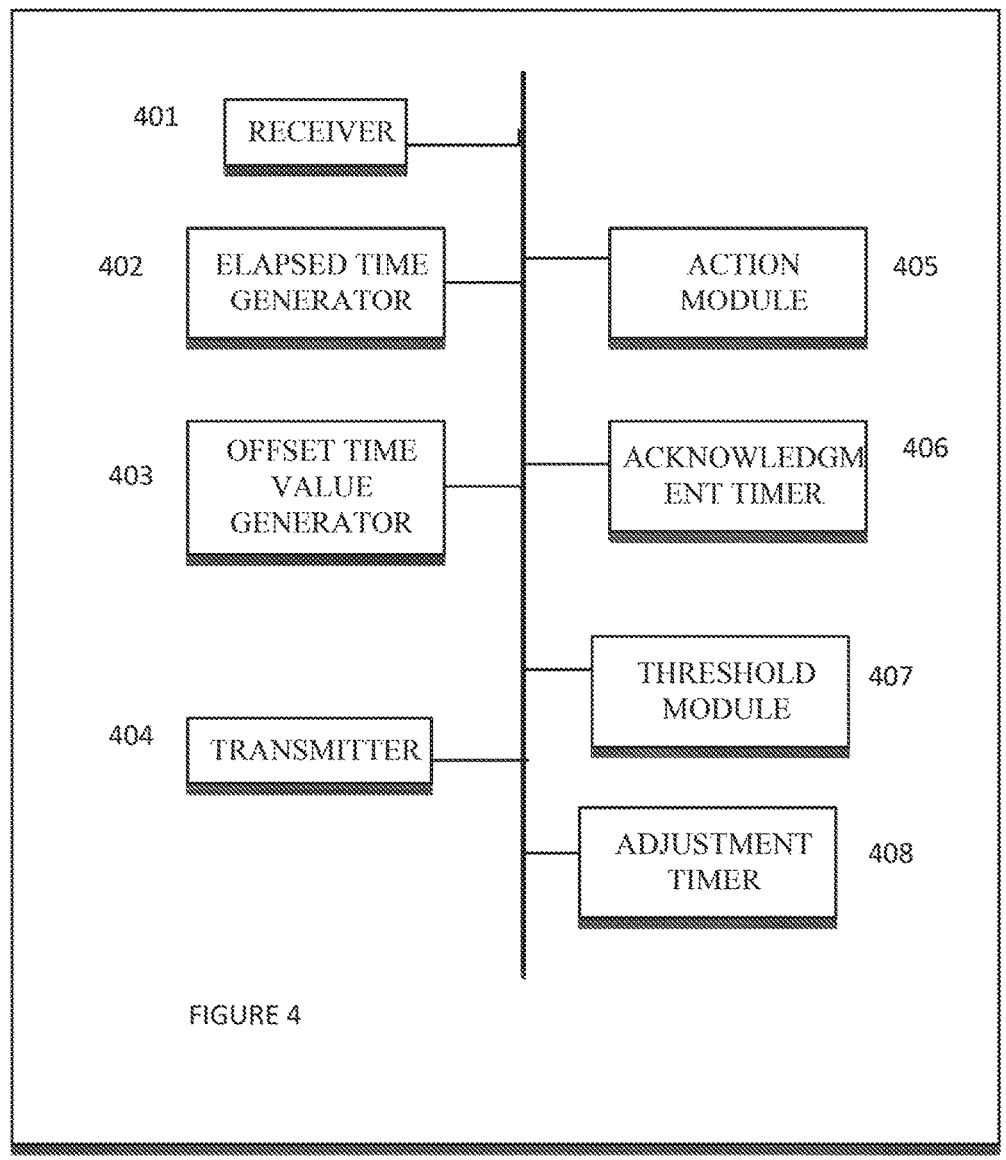
FIG. 4 shows a system in accordance with an implementation of the disclosed subject matter.

An implementation of the disclosed subject matter is shown in FIG. 4. Receiver 401 can receive a command and a first time value from a source such as a command and time value generator (not shown). Elapsed time generator 402 can measure the time difference between the time that the first device receives the command or first time value and the time at which the first device sends the command or the first time value to the second device. The elapsed time generated by the elapsed time generator 402 can be subtracted from the first time value by the offset time value generator 403 to generate an offset time. The command and the offset time can be sent to a second device by transmitter 404. Action module 405 can cause one or more events to occur either at about the first time value after the command or first time value were received at the first device; at about the offset time value after the command or offset time value were received at the second device; or both. Acknowledgment timer 406 can measure the time during which a forwarded command or time value is outstanding, e.g., until an acknowledgment is received from the intended recipient. If the acknowledgment takes too long, e.g., exceeds a predetermined threshold as determined by threshold module 407, then the message can be presumed to be lost, e.g., due to poor network conditions, a problem at the recipient, etc. Consequently, adjustment timer 408 can resend the command and/or an adjusted offset timer value by adding to the offset timer value about the amount of time that has elapsed between the time at which the command and the offset timer value were sent to the second device and the time at which the command and the adjusted offset timer value are sent to the second device.

While the foregoing description has discussed turning on or off one or more lights, many other functions may be accomplished by the systems and processes disclosed herein. For example, and in no way limiting the scope the disclosure or claims hereof, other functions include activating or deactivating one or more electronic device, opening or closing shades, locking or unlocking doors, starting or stopping projection of images or sound, sending one or more messages, and so on. Furthermore, while the aforementioned has focused on direct action (e.g., instructing a node to turn on a light), the present disclosure contemplates functions operating indirectly (e.g., node caused to send a message, the message resulting in the initiation of another action).

The foregoing description for purpose of explanation, have been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A computer-implemented method comprising:
   receiving, at a first device, a command and a first time value, the first time value representing a relative time at which at least one event is to occur;
   generating, at the first device, a second time value by subtracting a first elapsed time value from the first time value, the first elapsed time value being based upon a time between the receipt of the command or the first time value, and about a time at which the first device sends the command, or a second time value, to a second device;
   sending the command or the second time value from the first device to the second device; and
   causing at least one action to occur at the first device at about a time based on the first time value after which the command or first time value is received at the first device.

2. The computer-implemented method of claim 1, wherein the at least one action includes a plurality of events that are caused to occur at about the same time.

3. The computer-implemented method of claim 1, wherein the at least one action includes at least one event that occurs at the second device and no event occurs at the first device.

4. The computer-implemented method of claim 1, further comprising:
   storing a first timestamp based upon a value of a first device timer at about the time the command is received at the first device; and
   generating the elapsed time value based upon the difference between the value of the first device timer at about the time the command is sent from the first device to the second device and the value of the first timestamp.

5. The computer-implemented method of claim 1, further comprising causing the at least one action to occur at a time based upon the second time value.

6. The computer-implemented method of claim 1, further comprising:
   generating a second elapsed time value based upon the time between the receipt of the command at the second device and about the time at which the second device sends the command to a third device;
   generating a third time value based upon the elapsed time value from the second time value; and
   sending the command and the third time value from the second device to the third device.

7. The computer-implemented method of claim 1, further comprising:
   receiving the command and the second time value at the second device; and
   causing at least one action to occur at about the second time value after which the command is received at the second device.

8. The computer-implemented method of claim 1, further comprising:
   starting an acknowledgement timer at about the time the command and the second time value are sent to the second device;
   determining that the acknowledgement timer has attained a threshold value before receiving an acknowledgement from the second device;
   generating an adjusted second time value by adding to the second time value about an amount of time that has elapsed between the time at which the command and the second time value were sent to the second device and the time at which the command and the adjusted second time value are sent to the second device; and
   sending the command and the adjusted second time value to the second device.

9. The computer-implemented method of claim 1, wherein the first elapsed time value is further based on a transit time between the first device and the second device.

10. A system, comprising:
    a receiver adapted to receive at a first device a command and a first time value, the first time value representing a relative time at which at least one event is to occur;
    an offset time value generator adapted to generate an offset time value based upon the difference between a first elapsed time value and the first time value, the first elapsed time value first elapsed time value based upon the time between the receipt of the command and about the time at which the first device sends the command to a second device;
    a transmitter adapted to send the command and the offset time value from the first device to the second device; and
    an action module adapted to cause at least one event to occur at about the first time value after which the command is received at the first device, or to cause at least one event to occur at the second device and no event to occur at the first device, or to cause at least one event to occur at about the offset time value after the command is received at the second device.

11. The system of claim 10, further comprising an elapsed time generator adapted to generate at the first device the first elapsed time value based upon the time between the receipt of the command and about the time at which the first device sends the command to a second device.

12. The system of claim 10, further comprising:
    an acknowledgement timer adapted to start at about the time the command and the offset time value are sent to the second device;
    a threshold module adapted to determine that the acknowledgement timer has attained a threshold value before receiving an acknowledgement from the second device;
    an adjustment timer adapted to generate an adjusted offset time value by adding to the offset time value about an amount of time that has elapsed between the time at which the command and the offset time value were sent to the second device and the time at which the command and the adjusted offset time value are sent to the second device; and
    wherein the transmitter is further adapted to send the command and the adjusted offset time value to the second device.

13. A system comprising: one or more computers and one or more storage devices storing instructions which are operable, when executed by the one or more computers, to cause the one or more computers to perform operations comprising:
    receiving, at a first device, a command and a first time value, the first time value representing a relative time at which at least one event is to occur;
    generating, at the first device, a second time value by subtracting a first elapsed time value from the first time value, the first elapsed time value being based upon a time between the receipt of the command or the first time value, and about a time at which the first device sends the command, or a second time value, to a second device;

sending the command or the second time value from the first device to the second device; and causing at least one action to occur at the first device at about a time based on the first time value after which the command or first time value is received at the first device.

14. The system of claim 13, wherein the at least one action includes a plurality of events that are caused to occur at about the same time.

15. The system of claim 13 wherein the instructions further cause the one or more computers to perform operations comprising:

storing a first timestamp based upon a value of a first device timer at about the time the command is received at the first device; and generating the elapsed time value based upon the difference between the value of the first device timer at about the time the command is sent from the first device to the second device and the value of the first timestamp.

16. The system of claim 13 wherein the instructions further cause the one or more computers to perform operations comprising:

causing the at least one action to occur at a time based upon the second time value.

17. The system of claim 13 wherein the instructions further cause the one or more computers to perform operations comprising:

starting an acknowledgement timer at about the time the command and the second time value are sent to the second device;

determining that the acknowledgement timer has attained a threshold value before receiving an acknowledgement from the second device;

generating an adjusted second time value by adding to the second time value about an amount of time that has elapsed between the time at which the command and the second time value were sent to the second device and the time at which the command and the adjusted second time value are sent to the second device; and sending the command and the adjusted second time value to the second device.

18. The system of claim 13, wherein the at least one action includes at least one event that occurs at the second device and no event occurs at the first device.

19. The system of claim 13, wherein the instructions further cause the one or more computers to perform operations comprising:

generating a second elapsed time value based upon the time between the receipt of the command at the second device and about the time at which the second device sends the command to a third device;

generating a third time value based upon the elapsed time value from the second time value; and sending the command and the third time value from the second device to the third device.

20. The system of claim 13, wherein the instructions further cause the one or more computers to perform operations comprising:

receiving the command and the second time value at the second device; and causing at least one action to occur at about the second time value after which the command is received at the second device.

* * * * *